(12) United States Patent
Vecera et al.

(10) Patent No.: US 8,433,746 B2
(45) Date of Patent: Apr. 30, 2013

(54) ASPECT ORIENTED PROGRAMMING FOR AN ENTERPRISE SERVICE BUS

(75) Inventors: Martin Vecera, Brno (CZ); Jiri Pechanec, Mokra-Horakov (CZ)

(73) Assignee: Red Hat, Inc., Raleigh, NC (US)

( * ) Notice: Subject to any disclaimer, the term of this patent is extended or adjusted under 35 U.S.C. 154(b) by 420 days.

(21) Appl. No.: 12/786,957

(22) Filed: May 25, 2010

(65) Prior Publication Data

US 2011/0295922 A1  Dec. 1, 2011

(51) Int. Cl.
  *G06F 15/16* (2006.01)
(52) U.S. Cl.
  USPC .......................................................... 709/201
(58) Field of Classification Search .......... 709/201–228; 370/210–226; 718/100–105
  See application file for complete search history.

(56) References Cited

U.S. PATENT DOCUMENTS

| | | | |
|---|---|---|---|
| 7,895,475 B2 * | 2/2011 | Kulkarni et al. | 714/47.1 |
| 2008/0301637 A1 * | 12/2008 | Stark | 717/120 |
| 2009/0007084 A1 * | 1/2009 | Conallen et al. | 717/146 |
| 2009/0019421 A1 * | 1/2009 | Barcia et al. | 717/102 |
| 2009/0198496 A1 * | 8/2009 | Denecke | 704/257 |
| 2009/0327406 A1 * | 12/2009 | Miwa et al. | 709/203 |

* cited by examiner

*Primary Examiner* — Joseph Avellino
*Assistant Examiner* — Mark O Afolabi
(74) *Attorney, Agent, or Firm* — Lowenstein Sandler LLP

(57) ABSTRACT

A method and system for executing an additional action by an ESB server in response to detecting a predefined state of the ESB is described. One method identifies an object (e.g., message or event) at an ESB server of the computing system targeted for a first service deployed at the ESB server. The method further detects a predefined state of the ESB server, and when detected, the method executes an additional action by the ESB server without modifying a set of actions of the first service. Another method detects the predefined state by matching the object against a pointcut of an AOP aspect defined in the ESB server. The method executes the additional action by executing an advice of the aspect to perform the additional action when the object matches the pointcut.

17 Claims, 6 Drawing Sheets

ASPECT ORIENTED PROGRAMMING FOR AN ENTERPRISE SERVICE BUS

TECHNICAL FIELD

Embodiments of the present invention relate to development of service oriented architecture (SOA), and more specifically, to applying aspect oriented programming (AOP) to an Enterprise Service Bus (ESB) server to execute an action by the ESB server in response to a predefined state of the ESB server without modifying services deployed at the ESB server.

BACKGROUND

The Service Oriented Architecture (SOA) is a popular architectural paradigm for the development of software applications. For example, web services provide the SOA to other applications via industry standard network, interfaces and protocols. The SOA is based on loosely-coupled and standards-based architectures. It is one approach to distributed computing that allows networked software resources to be leveraged.

An Enterprise Service Bus (ESB) is an underlying infrastructure for the SOA. An ESB server implements the abstract design concept of the SOA. The ESB server is an event-driven and standards-based messaging engine that provides services for more complex architectures. The ESB server provides an infrastructure that links together services and clients to enable distributed applications and processes. The ESB server can be run on one or more nodes, and each node can be a virtual or physical machine running one or more instances of the ESB server. The ESB server allows systems to interact through standard transports, such as file transfer protocol (FTP) and hypertext transfer protocol (HTTP), and to provide SOA-based applications. The ESB server provides the capabilities of message handling, filtering, data transformation, content-based routing, and message repositories. The ESB server provides the above capabilities to a client using a service deployed on an ESB server at runtime that exchanges messages with the client. The service may be defined as a list of action classes that process an incoming message in a sequential manner, for example. The ESB server allows for the distribution of service instances across many nodes.

The ESB server provides an effective way of processing various kinds of messages and events. Unfortunately, conventionally, there is no way for the ESB server to execute any actions other than those actions associated with receiving an incoming message (or event) targeted for a service deployed on the ESB server and directing the incoming message to the targeted service. The service deployed on the ESB server may detect certain conditions for a particular message (or event) to invoke another service, but the ESB server cannot detect the conditions to invoke the other service, as illustrated in the conventional approach of FIG. 1.

FIG. 1 illustrates one approach to forward a message from one service to another in a conventional ESB server configuration. In this example, the Services A and B guarantee fast message processing. To satisfy this requirement, the Services A and B defer message processing to Service D for messages larger than 50 KB, for example. It should be noted that Service C does not have such a requirement. In order to forward messages that meet that conditions, Services A and B contain custom configurable actions or customizable code that says, for example: If message_size>50 KB Then Forward message to Service D. Whenever the requirement is modified, such as setting the message size threshold to 75 KB, a programmer has to remove the condition or create a new condition according to the new business rules within the code for both Services A and B. Since the code of both Services A and B have been modified, and since the actions have been modified, the code corresponding to Services A and B (and possibly other related code) would also need to be recompiled for the new business rules to be implemented. Similarly, if the programmer desires Service C to provide such functionality, the programmer has to modify Service C with the new business rules and recompile the code for the Service C.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
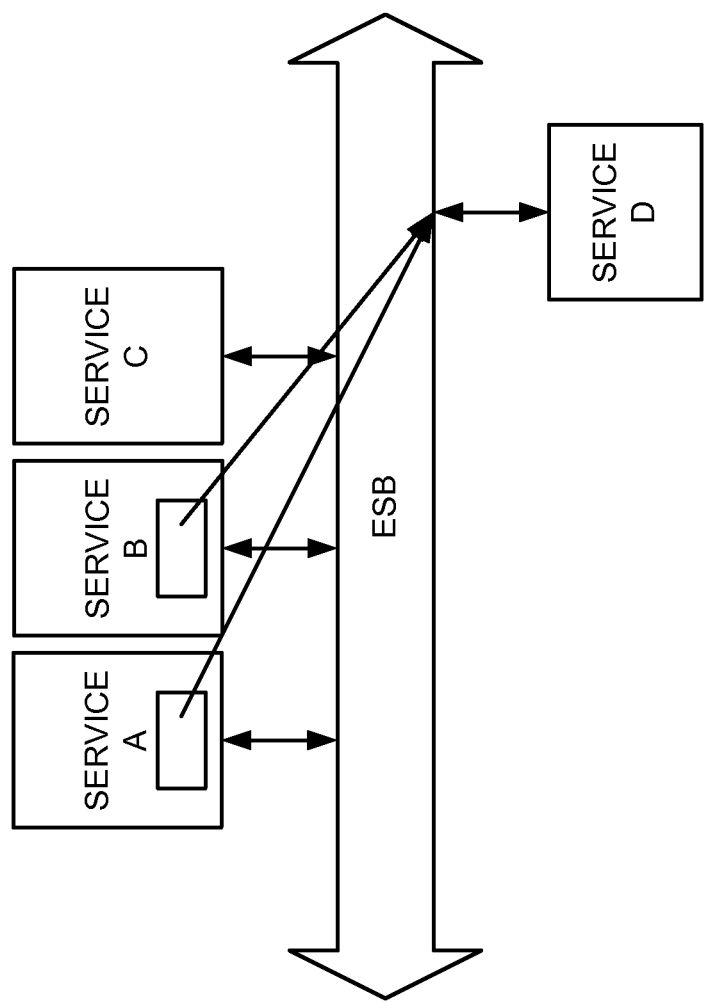
FIG. 1 illustrates one approach to forward a message from one service to another in a conventional ESB server configuration.

A method and system for executing an additional action by an ESB server in response to a detected predefined state of the ESB server is described. In one embodiment, a method includes identifying an object (e.g., message or event) at an ESB server of the computing system targeted for a first service deployed at the ESB server. The first service is defined by a set of actions. The method further detects a predefined state of the ESB server, and when detected, the method executes an additional action by the ESB server without modifying the set of actions of the first service, such as modifying existing actions of the set or adding new actions to the set of actions of the first service. In one embodiment, the ESB server supports Aspect-Oriented Programming (AOP), and the method detects the predefined state by matching the object against a pointcut of an aspect defined in the ESB server. The method further includes executing the additional action by executing an advice of the aspect to perform the additional action when the object matches the pointcut.

In one embodiment, the method includes routing the object to a second service deployed at the ESB server. In another embodiment, the method includes routing the object to the second service while the first service continues normal operation. In yet another embodiment, the method includes sending an email message to a system administrator.

As described above, the conventional ESB servers could not execute any actions other than those associated with routing the incoming messages (or events) to the targeted service, and the conventional ESB servers could not detect a predefined state of the ESB server. The embodiments described herein provide the ability to execute an additional action by an ESB server in response to detecting a predefined state of the ESB server. In some embodiments, the ESB server provides the ability to define pointcuts, similar to pointcuts used in Aspect-Oriented Programming, at the ESB server, and conditions that must be met at those pointcuts to call another service, which can react to the predefined state.

For example, in one embodiment, one pointcut in the ESB server defines 1) one or more targeted services, and 2) the conditions that an incoming message targeted to these services needs to meet. The corresponding advice can define the action to be taken when the incoming message matches the pointcut. For example, the pointcut may define the targeted Services A and B, and a condition that the message targeted to these services that are greater than a specified amount, and the advice may define the action to forward the incoming message to Service D. When an incoming message matches this condition, the ESB server performs the advice and forwards the incoming message to the Service D. Typically conditions may include, for example, processing time for the Action, processing time for the whole Service, the size of message body of the message, or the like. When all the conditions are met, the ESB server passes the message that met the conditions to a predefined service while the original service continues normal operation. The embodiments described herein can be used to prevent Denial-of-Service (DoS) attacks, such as caused by a large message intended to make a computer resource unavailable to its intended users. The embodiments described herein may also be used to override functionality of an original service, reconfigure the original service to use a backup service, for example, accommodate messages that take up to much processing time or when a connection is lost. The embodiments described herein may also be used to configure the ESB server to send an email to a system administrator when a predefined state of the ESB server is detected.

Embodiments of the present invention provide an improved ESB server that executes an action in response to a predefined state of the ESB server without modifying the set of actions of the services themselves. By integrating an AOP aspect into the ESB server, the ESB server can perform the advice of the AOP aspect in response to matching the incoming message to the pointcut of the AOP aspect without any modification to the deployed services. Instead of changing customizable code in the deployed services, the programmer can use AOP aspects to define pointcuts in the ESB server, and the conditions that must be met at those pointcuts to call another service. This allows the ESB server to detect a predefined state and to execute an additional action without modifying or adding actions to the deployed services. Also, by integrating the AOP aspect into the ESB server, the AOP aspect can be integrated and/or modified without recompiling the code of the deployed services. Any subsequent changes to the AOP aspects can be made and the AOP aspects can be recompiled at the AOP level without any modifications to the services and without recompiling the code of the services.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "detecting," "executing," "deploying," "defining," "sending," "presenting," "signing," "publishing," "approving," "authenticating," "archiving," "processing," "providing," "computing," "calculating," "determining," "displaying," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computer system specifically programmed by a computer program stored in the computer system. Such a computer program may be stored in a computer-readable storage medium, such as, but not limited to, any type of disk including, optical disks, CD-ROMs, and magnetic-optical disks, read-only memories (ROMs), random access memories (RAMs), EPROMs, EEPROMs, magnetic or optical cards, or any type of media suitable for storing electronic instructions.

Figure 2:
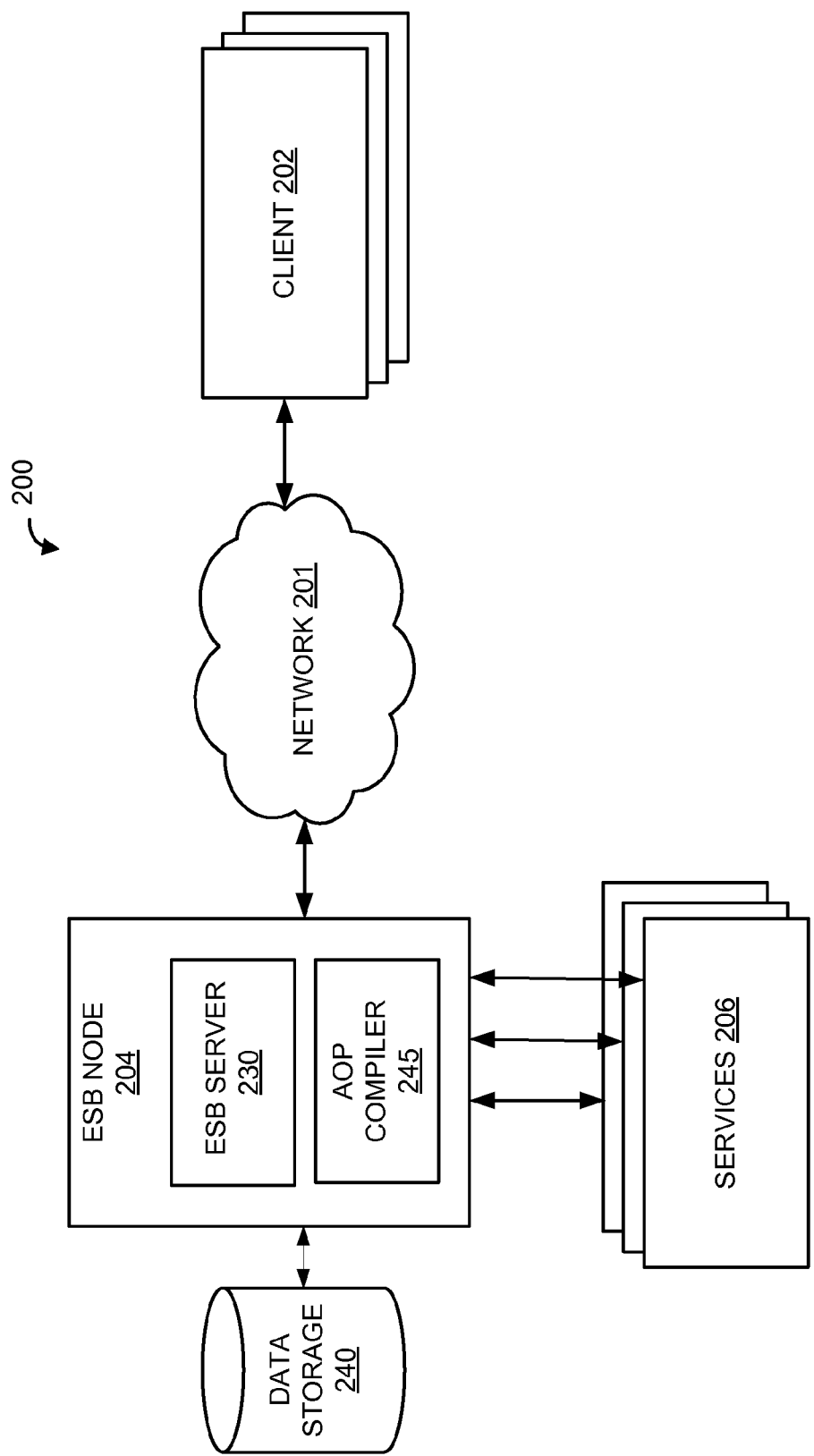
FIG. 2 is a block diagram of exemplary network architecture in which embodiments of an Enterprise Service Bus (ESB) server, having an Aspect-Oriented Programming (AOP) aspect, may operate.

FIG. 2 is a block diagram of exemplary network architecture in which embodiments of an Enterprise Service Bus (ESB) server, having an AOP aspect, may operate. The network architecture 200 may include an ESB node 204 and one or more clients 202 connected via a network 201, which may be a private network (e.g., a local area network (LAN), wide area network (WAN), intranet, etc.) or a public network (e.g., the Internet).

The client 202 may be a computing device such as, for example, a desktop computer, laptop computer, server computer, cellular phone, personal digital assistant (PDA), etc. In one embodiment, the client 202 is a server of an enterprise, but is a "client" with respect to the ESB node 204. The ESB node 204 may be one or more machines including one or more server computers, gateways, or other computing systems. The ESB node 204 may run one or more instances of the ESB server 230.

Before further describing the aspect-oriented programming (AOP) aspects, some terminology relating to the AOP is explained as follows. In object-oriented programming (e.g., Java, C++, etc.), functions of a computer program can be divided into interdependent modules. Each module is a component of a program that performs a specific set of related behaviors. Design features that affect multiple different modules are referred to as crosscutting concerns. Examples of crosscutting concerns include security, data logging, session management, authentication, performance measurement, etc. AOP is a programming approach that was developed to manage crosscutting concerns. In AOP, crosscutting concerns are encapsulated in a number of program modules called aspects. An aspect includes a pointcut and advice. A pointcut is program code that picks out certain join points (e.g., method calls, exception throws, etc.) and values at those points. The advice is code, including one or more operations, which can be executed when a join point is reached. Advice defines crosscutting functionality that transparently forces a modification to program modules or adds additional functionality to program modules.

The ESB node 204 may also run an AOP compiler 245 to add an aspect to the ESB server 230 so that an advice of the aspect can be performed when a message meets a condition of a pointcut of the aspect. The aspect addresses the crosscutting concern of the deployed services. For example, the aspect may identify a message whose message body is too large and may send the message to a second service to process the message.

In accordance with one embodiment of the present invention, the ESB server 230 may use an aspect, added by the AOP compiler 245, to detect a predefined state of the ESB server 230 and to execute an additional action by the ESB server 230 without modifying the set of actions of the deployed services 206. The techniques described herein can be applied to any deployed service 206 for any tasks and any purposes, and can be performed without modification to the source code of client applications and/or the services 206 deployed at the ESB server 230. The addition of the aspect to the ESB server 230 does not change the services deployed at the ESB server 230, and does not change the source code of client applications run on the client 202. It is not necessary to add customizable code to multiple different client application and multiple different services to implement additional cross cutting actions. Rather, one or more aspects can be added to the ESB server 230 for use by the multiple different client applications and the multiple different services.

The AOP compiler 245 may build an aspectized ESB (e.g., ESB server 230 having one or more AOP aspects). The aspect causes the ESB server 230, with service deployed thereto, to detect a predefined condition and to execute one or more additional actions when the predefined condition is matched. In one embodiment, the JBoss AOP compiler can be used, such as the ajc compiler or the abc compiler. Alternatively, other types of compilers can be used as would be appreciated by one of ordinary skill in the art having the benefit of this disclosure. In another embodiment, the AOP compiler 245 is implemented external to the ESB node and the aspectized ESB server can be loaded on the ESB node 204. In alternative embodiments, the AOP compiler 245 may be stored in the main memory of the ESB server 230.

In one embodiment, the code and associated data related to the services 206, the ESB server 230, and the AOP compiler 245 can be stored in data storage 240 that is accessible by the ESB sever 230. The data storage 240 may include one or more storage devices (e.g., the computer-readable medium described above) that are local to the ESB node 240 and/or remote from the ESB node 204.

The client 202 interacts with the ESB server 230 by exchanging messages via standard protocols, e.g., FTP and HTTP. The client 202 runs client applications to generate messages that are to be processed by services deployed on the ESB server 230. The client 202 may also include a graphic user interface (GUI) for viewing the results provided from the ESB server 230. The ESB server 230 executes one or more deployed services 206 (e.g., by calling one or more methods contained in the code that implements the services). The services may be system services including invocation support, routing (static/deterministic routing, content-based routing, rules-based routing, policy-based routing), mediation, messaging, process choreography, service orchestration, complex event processing, security (encryption and signing), reliable delivery, transaction management, management (e.g., monitoring, audit, logging, metering), and user defined services. Through the ESB server 230, users of the client 202 can send requests and receive the information provided by the deployed services 206.

In one embodiment, the client 202 runs a client application that generates a message and the client 202 sends the message to an input message queue on the ESB server 230. The deployed service 206 "listens" or checks the input message queue of the ESB server 230 and processes the messages in the queue targeted to the particular deployed service 206. Before, after, or during the processing of the messages by the deployed services 206, the ESB server 230 detects a predefined state of the ESB server 230, such as when a message matches the pointcut of the aspect defined in the ESB server 230, and performs an additional action, such as performing the advice of the aspect when the pointcut matches.

In one embodiment, the ESB node 204 can provide a console to an administrator of the ESB server 230 to add, modify, or remove aspects from the ESB server 230. For example, the administrator can modify the pointcuts, the advice, or both to configure and/or reconfigure the additional services to be performed by the ESB server 230 in response to the detected predefined state of the ESB server 230. For example, the administrator may setup one or more aspects to perform ESB monitoring using the console. The functionality of the ESB server 230, having one or more aspects, during operation is described in more detail below with respect to FIGS. 3-5.

Although the term "ESB server" is used in the description, a person of ordinary skill in the art will appreciate that the embodiments described herein can be applied to any server that provides a deployed service to a client that communicates with the server by messages.

Figure 3:
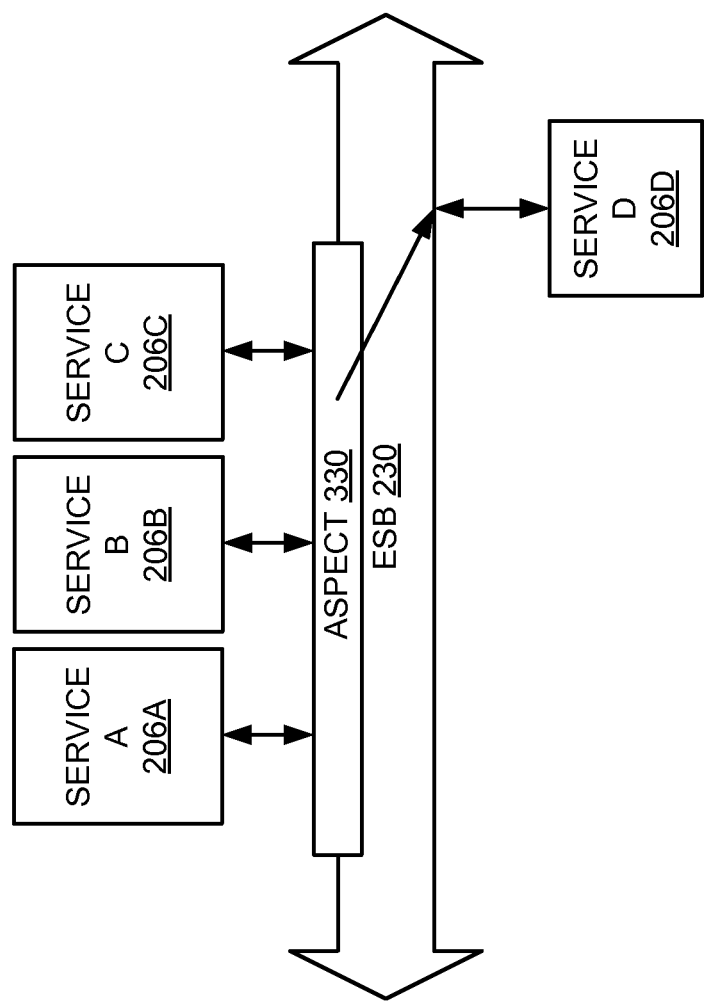
FIG. 3 illustrates one approach to forward a message from one service to another using the ESB server of FIG. 2 according to one embodiment.

FIG. 3 illustrates one approach to forward a message from one service to another using the ESB server 230, having an AOP aspect, of FIG. 2 according to one embodiment. Instead of adding or modifying customizable code in the respective services, the AOP compiler 245 adds an aspect 330 to the ESB server 230. The aspect 330 includes a pointcut and an advice. The pointcut includes code to detect a predefined state of the ESB server 230, such as to identify a condition of an object (e.g., message or event) received at the ESB server 230. The operations specified in the advice are triggered when the pointcut is encountered. The advice specifies the operations to perform an additional action without modifying the set of actions of the Services A-D 206A-206D deployed at the ESB server 230. Service definitions and action classes may define the deployed services 206A-206D. The data associated with the deployed services 206 can be stored in the data storage 240. Each service provided by the ESB server 230 may be defined by the service definitions and is described as a sequence of actions. The action classes (e.g., compiled Java code) implement the set of actions of the services 206. When the ESB node 204 runs the AOP compiler 245, the AOP compiler 245 can aspectize the action classes. During execution of the ESB server 230, the ESB server 230 can recognize the action that is added and can execute the aspect when the aspect is met. For example, the ESB server 230 may receive a message targeted for Service A 206A. If the ESB server 230 detects that the message matches the aspect, the ESB server 230 can route the message targeted for Service A 206A to the Service D 206D for processing. In an embodiment where the ESB node 240 runs a Java Virtual Machine, the Java Virtual Machine recognizes the aspect that is added to the action classes and executes the aspect.

For example, in comparison to the approach described with respect to FIG. 1, the AOP compiler 245 adds an aspect 330 to the ESB sever 230, instead of adding or modifying the Services 206A and 206B with customizable code (e.g., If message_size>50 KB Then Forward message to Service D). In this example, the aspect 330 includes a pointcut: message_size>50 KB and (target_service='Service A' or target_service='Service B'). When the client 202 sends the message to the ESB server 230 to be delivered to one of the services, the ESB server 230 matches the message against all pointcuts defined in the ESB configuration, including the aspect 330 with the pointcut defined above. For example, if the message is larger than 50 KB and is targeted to Service A 602A or Service B 602B then the ESB server 230 executes the advice of the aspect 330, which, in this example, routes the message to the Service D 206D. In this embodiment, the Service A 206A and Service B 206B do not contain any custom code like as done conventionally to forward the incoming message to the Service D. In one embodiment, if the business requirements need to be changed, the reconfiguration can take places only at the AOP level, for example, by modifying the aspect's pointcut, advice or both to change the functionality or services to which the modified behavior applies.

Although FIG. 3 illustrates an embodiment where the aspect 330 reroutes a message targeted to Services 602A or 602B and having a message body greater than 50 KB, in other embodiments other aspects can be defined to perform additional actions by the ESB server 230. For example, the ESB 230 can execute the additional action by deploying a second service and then routing the message to the second service. The second service may be a backup service, for example, which is used when the targeted service is taking too long to process a particular message or to perform the service, when the targeted services exceeds a threshold number of messages in a corresponding queue, or the like. In another embodiment, the ESB server 230 can route the object to a second service while the targeted service continues normal operation. In yet another embodiment, the ESB server 230 can send an email message to a system administrator when the predefined state of the ESB server 230 is detected, for example, when one of the services 206A-D processes a message that matches the pointcut of the aspect 330.

Figure 4A:
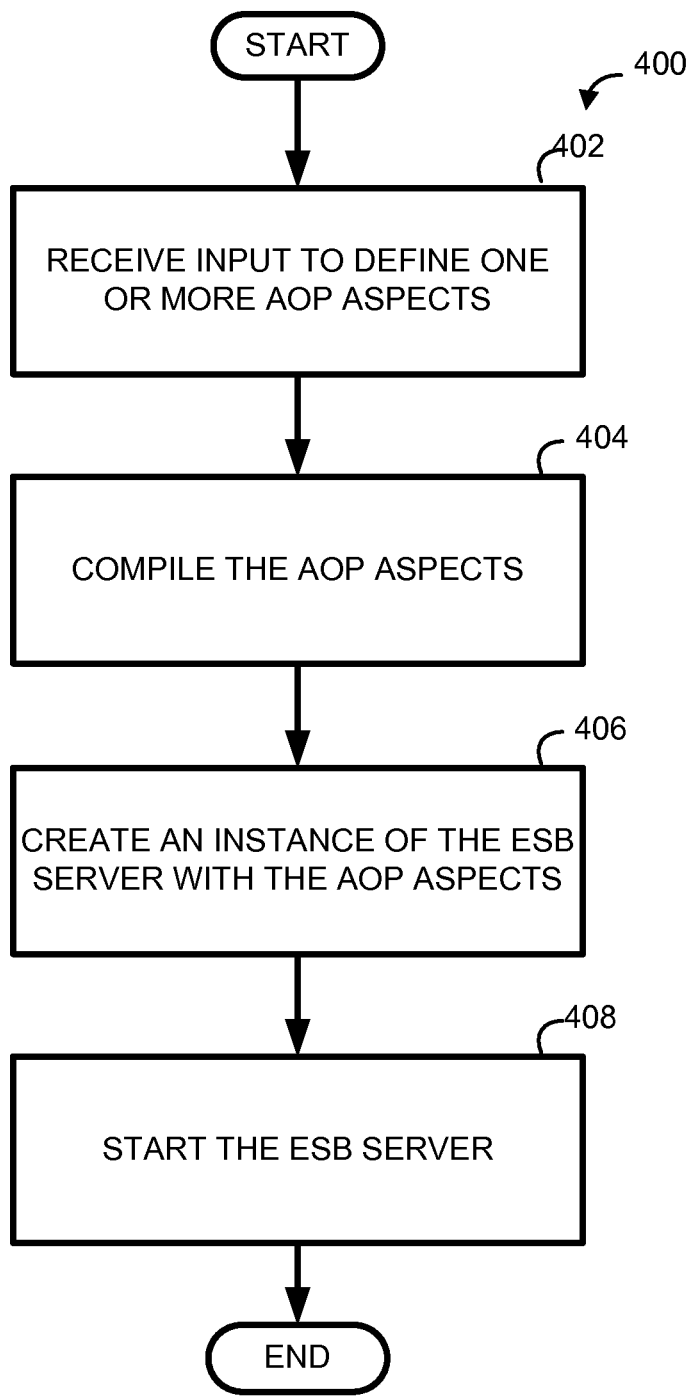
FIG. 4A is a flow diagram of one embodiment of a method of adding an AOP aspect to an ESB server.

FIG. 4A is a flow diagram of one embodiment of a method 400 of adding an AOP aspect to an ESB server. The method 400 is performed by processing logic that may comprise hardware (circuitry, dedicated logic, etc.), software (such as is run on a general purpose computer system or a dedicated machine), firmware (embedded software), or any combination thereof. In one embodiment, the ESB node 204 of FIG. 2 performs the method 400. Alternatively, other components of the ESB node 204 can perform some or all of the operations of method 400, such as the AOP compiler 235 of FIG. 2.

Figure 4B:
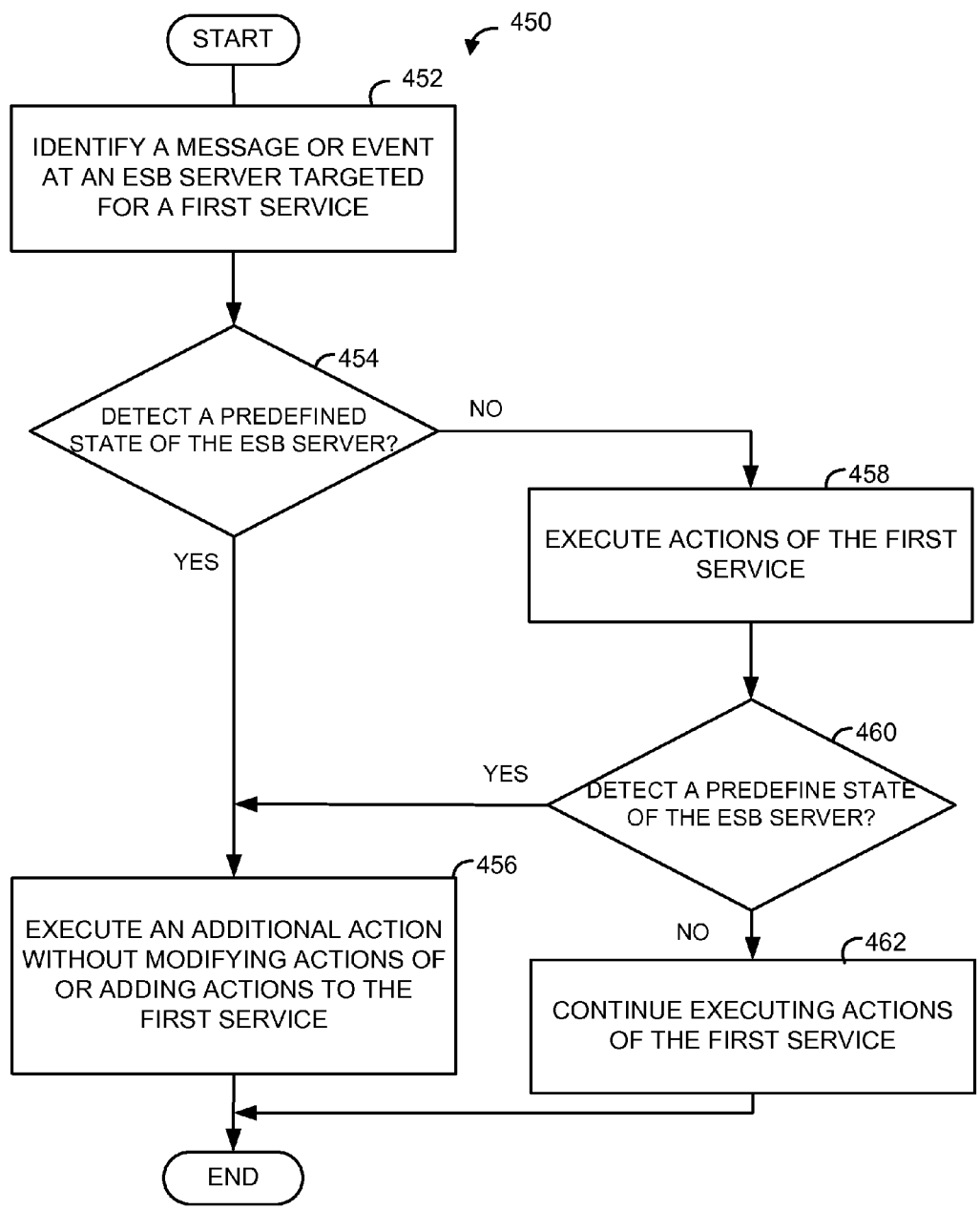
FIG. 4B is a flow diagram of one embodiment of a method of executing an additional action by an ESB server itself in response to detecting a predefined state of the ESB server.

Referring to FIG. 4A, processing logic begins with receiving input to define one or more aspects in an instance of the ESB server (block 402). The input may be received from a programmer or administrator of the ESB server. The input may be received at the ESB server 204 using a user interface (e.g., web interface or a command line interface) in which the programmer or administrator defines the pointcuts and advices of the AOP aspects. In another embodiment, the input may be stored in a file accessed by the ESB server 204. Next, the processing logic complies the AOP aspects (block 404), and creates an instance of the ESB server with the modified or created AOP aspects (block 406). After compiling, the processing logic starts the ESB server having the AOP aspects for normal operation (block 408), and the method ends. In another embodiment, the programmer or administrator can modify existing AOP aspects in the ESB server, add additional AOP aspects, or remove AOP aspects. The processing logic receives additional input that defines the AOP aspects, recompiles the AOP aspects, creates by a programmer to create or modify an AOP aspect for the ESB server FIG. 4B is a flow diagram of one embodiment of a method 450 of executing an additional action by an ESB server in response to detecting a predefined state of the ESB server. The method 450 is performed by processing logic that may comprise hardware (circuitry, dedicated logic, etc.), software (such as is run on a general purpose computer system or a dedicated machine), firmware (embedded software), or any combination thereof. In one embodiment, the AOP module of FIG. 2 performs the method 450. In another embodiment, the ESB server 230 of FIG. 2 performs the method 450. Alternatively, other components of the network architecture 200 can perform some or all of the operations of method 450.

Referring to FIG. 4B, processing logic begins with receiving an object at an ESB server targeted for a first service deployed at the ESB server (block 452). Next, the processing logic determines whether a predefined state of the ESB server is detected (block 454). If so, the processing logic executes an additional action without modifying actions or adding actions to the first service (block 456), and the method ends. However, if at block 404 the processing logic does not detect the predefined state, the processing logic executes the set of actions of the first service (block 458). During execution of the set of actions of the first service, the processing logic determines if a predefined state of the ESB server is detected (block 460). If so, the processing logic executes the additional action at block 456. If the predefined state is not detected at block 460, the processing logic continues executing the set of actions of the first service as normal (block 462). In another embodiment, if the predefined state is detected at block 460, the processing logic executes the additional action at block 456 and continues executing the set of actions of the first service as normal. For example, the processing logic may reroute the message being processed by the first service to a second server at block 456 and continue processing a second message targeted to the first service at block 462.

In one embodiment, the processing logic at block 456 routes the object to a second service deployed at the ESB server. In another embodiment, the processing logic at block 456 deploys a second service at the ESB server and routes the object targeted for the first service to the second service. In one embodiment, the second service is a backup service to the first service. In another embodiment, the processing logic at block 456 sends an email to a system administrator.

In another embodiment, the processing logic supports AOP and the processing logic detects the predefined state at block 454 (and 460) by matching the object against a pointcut of an aspect defined in the ESB server, and executes the additional action at block 456 by executing an advice of the aspect by the ESB server to perform the additional action when the object matches the pointcut at block 454. This approach can perform the additional action without modifying the set of actions of the first service, such as modifying existing actions of the set or adding new actions to the set of actions of the first service. In one embodiment, the processing logic executes the advice to route the object to a second service, while the first service continues normal operation. In another embodiment, the processing logic defines the predefined state of the ESB server using an aspect. This may be in response to user input received from an administrator of the ESB server 230. In this embodiment, the aspect includes a pointcut and an advice. The pointcut identifies a target service and an action inside of the target service and a condition that the object passing this action needs to meet. The advice identifies a second service to process the object when the pointcut is met. In one embodiment, the condition is a processing time for the action identified in the pointcut. In another embodiment, the condition is a processing time for the first service identified in the pointcut. In yet another embodiment, the condition is a size of a message body of the message targeted for the first service. The processing logic can also add, remove, or modify existing aspects to change the additional behavior performed by the ESB server when the predefined states are detected.

In another embodiment, the processing logic executes the set of actions of the first service, and during the execution of the set of actions, the processing logic detects whether a given join point in the program matches a pointcut of an aspect defined in the ESB server. The aspect can alter the behavior of the program by executing the additional action to perform additional behavior at the given join point when the join point matches the pointcut. When the given join matches the pointcut, the processing logic applies an advice of the aspect to execute the additional action to perform the additional behavior.

Figure 5:
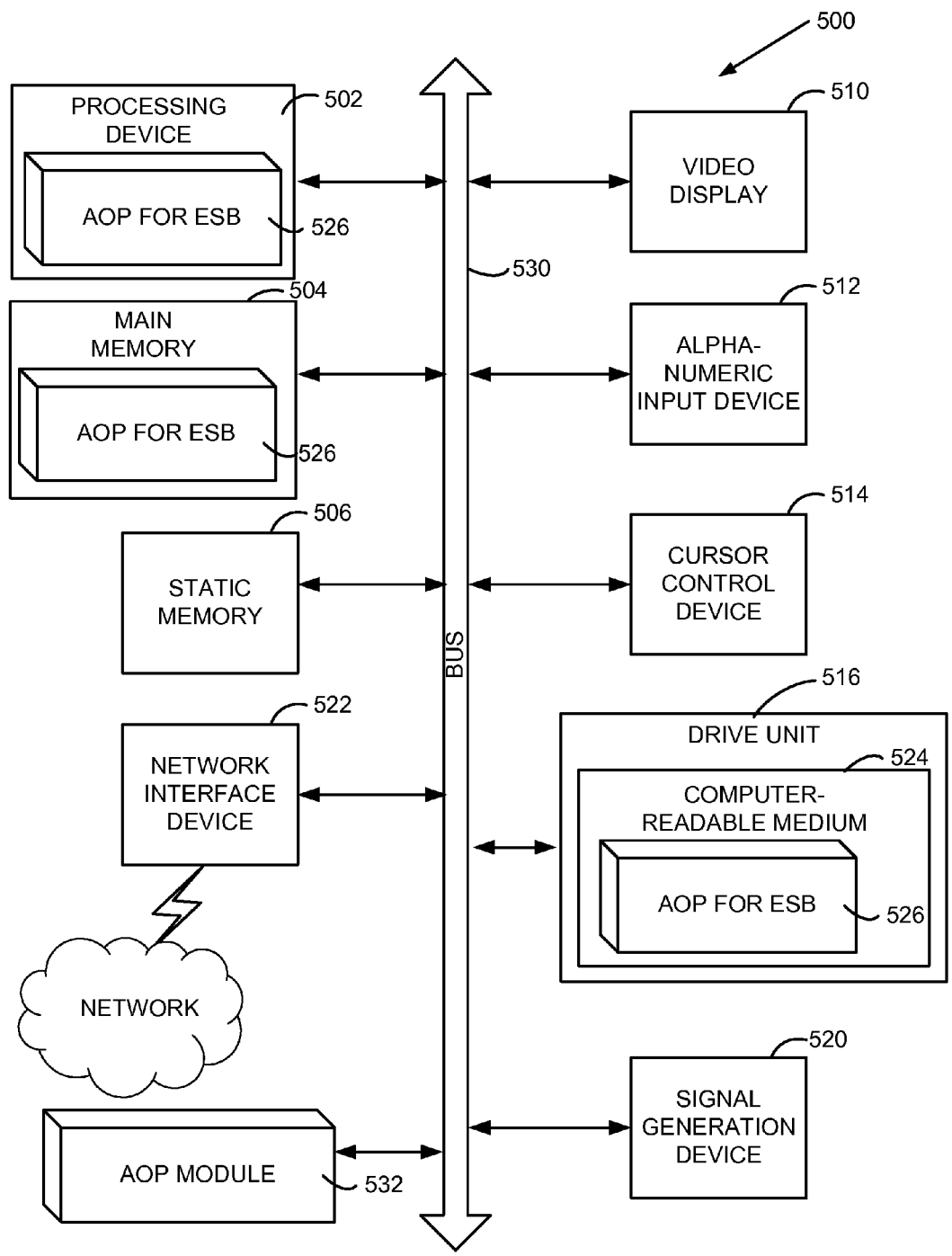
FIG. 5 illustrates a diagrammatic representation of a machine in the exemplary form of a computing system for defining and executing an ESB server with AOP aspects.

FIG. 5 illustrates a diagrammatic representation of a machine in the exemplary form of a computing system 500 for defining and executing AOP aspects for the ESB server. Within the computing system 500 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for AOP operations in the ESB server, such as the methods 400 and 450 described above. In one embodiment, the computing system 500 represents various components that may be implemented in the ESB node 204 as described above. Alternatively, the ESB node 204 may include more or less components as illustrated in the computing system 500.

The exemplary computing system 500 includes a processing device 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 516, each of which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic (e.g., AOP for ESB 526) for performing the operations and steps discussed herein.

The computing system 500 may further include a network interface device 522. The computing system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable storage medium 524 on which is stored one or more sets of instructions (e.g., AOP for ESB 526) embodying any one or more of the methodologies or functions described herein. The AOP for ESB 526 may also reside, completely or at least partially, within the main memory 504 and/or within the processing device 502 during execution thereof by the computing system 500, the main memory 504 and the processing device 502 also constituting computer-readable storage media. The AOP for ESB 526 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The AOP module 532, components, and other features described herein (for example in relation to FIGS. 2 and 3) can be implemented as discrete hardware components or integrated in the functionality of hardware components such as ASICS, FPGAs, DSPs or similar devices. In addition, the AOP module 532 can be implemented as firmware or functional circuitry within hardware devices. Further, the AOP module 532 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method, comprising:
identifying, at an enterprise service bus (ESB) server of a computing system, an object targeted for a first service deployed at the ESB server, wherein the first service is defined by a set of actions, wherein the ESB server integrates an Aspect-Oriented Programming (AOP) aspect;
detecting a predefined state of the ESB server, wherein said detecting the predefined state comprises matching the object against a pointcut of the AOP aspect;
when the predefined state of the ESB server is detected, executing an additional action by the ESB server without modifying the set of actions of the first service, wherein said executing the additional action comprises executing an advice of the AOP aspect to perform the additional action when the object matches the pointcut;
during executing the set of actions of the first service, detecting whether a given join point in the program matches the pointcut of the AOP aspect defined in the ESB server, wherein the AOP aspect is to alter the behavior of the program by executing the additional action to perform additional behavior at the given join point when the join point matches the pointcut without modifying the set of actions of the first service; and
when the given join matches the pointcut, applying the advice of the AOP aspect to execute the additional action to perform the additional behavior.

2. The method of claim 1, wherein said executing the additional action comprises routing the object to a second service deployed at the ESB server.

3. The method of claim 1, further comprising deploying the first service at the ESB server, and wherein said executing the additional action comprises:
deploying a second service at the ESB server; and
routing the object targeted for the first service to the second service.

4. The method of claim 1, wherein said executing the advice comprises routing the object to a second service.

5. The method of claim 4, wherein said executing the advice comprises routing the object to the second service while the first service continues normal operation.

6. The method of claim 4, wherein the second service is a backup service to the first service.

7. The method of claim 1, wherein said executing the advice comprises sending an email message to a system administrator.

8. The method of claim 1, wherein the pointcut defines a target service, and a condition that the object targeted to the target service needs to meet, and wherein the advice defines a second service to process the object when the pointcut is met.

9. The method of claim 8, wherein the condition is a processing time for the action identified in the pointcut.

10. The method of claim 8, wherein the condition is a processing time for the first service identified in the pointcut.

11. The method of claim 8, wherein the condition is a size of a message body of the message targeted for the first service.

12. The method of claim 8, further comprising modifying the aspect by modifying at least one of the pointcut and the advice.

13. A non-transitory computer readable storage medium including instructions that, when executed by a computing system, cause the computing system to perform operations comprising:
identifying, at an enterprise service bus (ESB) server of a computing system, an object targeted for a first service deployed at the ESB server, wherein the first service is defined by a set of actions, wherein the ESB server integrates an Aspect-Oriented Programming (AOP) aspect;
detecting a predefined state of the ESB server, wherein said detecting the predefined state comprises matching the object against a pointcut of the AOP aspect;
when the predefined state of the ESB server is detected, executing an additional action by the ESB server without modifying the set of actions of the first service, wherein said executing the additional action comprises executing an advice of the AOP aspect to perform the additional action when the object matches the pointcut;
during executing the set of actions of the first service, detecting whether a given join point in the program matches the pointcut of the AOP aspect defined in the ESB server, wherein the AOP aspect is to alter the behavior of the program by executing the additional action to perform additional behavior at the given join point when the join point matches the pointcut without modifying the set of actions of the first service; and
when the given join point matches the pointcut, applying the advice of the AOP aspect to execute the additional action to perform the additional behavior.

14. The computer readable storage medium of claim 13, wherein the operations further comprise modifying the aspect by modifying at least one of the pointcut and the advice.

15. A computing system, comprising:
data storage to store data associated with a plurality of services to be deployed at an enterprise service bus (ESB) server, wherein each of the plurality of services is defined by a set of actions, wherein the ESB server integrates an Aspect-Oriented Programming (AOP) aspect; and
the ESB server, coupled to the data storage, the ESB server is to identify an object at the ESB server targeted for a first service deployed at the ESB server, to detect a predefined state of the ESB server by matching the object against a pointcut of the aspect, and, when the predefined state of the ESB is detected, to execute an additional action by the ESB server by executing an advice of the aspect to perform the additional action when the object matches the pointcut without modifying the set of actions of the first service, wherein the ESB server is further to detect whether a given join point in the program matches the pointcut of the AOP aspect defined in the ESB server, wherein the AOP aspect is to alter the behavior of the program by executing the additional action to perform additional behavior at the given join point when the join point matches the pointcut without modifying the set of actions of the first service, and wherein the ESB server is further to apply the advice of the AOP aspect to execute the additional action to perform the additional behavior when the given join matches the pointcut.

16. The computing system of claim 15, wherein the data storage is to store a compiler that adds the AOP aspect to the ESB server, the AOP aspect to cause the ESB server to detect the predefined state of the ESB server and to execute the additional action when the predefined state of the ESB is detected.

17. The computing system of claim 15, wherein the pointcut identifies a target service and an action inside of the target service, and a condition that the object passing this action needs to meet, and wherein the advice identifies a second service to process the object when the pointcut is met.

\* \* \* \* \*